United States Patent
Kim et al.

(10) Patent No.: US 11,304,173 B2
(45) Date of Patent: Apr. 12, 2022

(54) NODE LOCATION TRACKING METHOD

(71) Applicant: KOREA INSTITUTE OF SCIENCE AND TECHNOLOGY, Seoul (KR)

(72) Inventors: Doik Kim, Seoul (KR); Jung Hee Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/006,478

(22) Filed: Aug. 28, 2020

(65) Prior Publication Data

US 2021/0266861 A1    Aug. 26, 2021

(30) Foreign Application Priority Data

Feb. 21, 2020   (KR) .................. 10-2020-0021369

(51) Int. Cl.
   *H04W 24/00* (2009.01)
   *H04W 64/00* (2009.01)
   *G01S 5/02* (2010.01)

(52) U.S. Cl.
   CPC ......... *H04W 64/003* (2013.01); *G01S 5/0289* (2013.01); *G01S 5/0294* (2013.01)

(58) Field of Classification Search
   CPC ....... H04W 4/33; H04W 12/06; H04W 12/77; H04W 4/30; H04W 4/38; H04W 4/029; H04W 4/80; H04W 24/10; H04W 4/021; H04W 64/003
   USPC .............. 455/456.1, 556.1, 462.1, 41.2, 41.3
   See application file for complete search history.

(56) References Cited

U.S. PATENT DOCUMENTS

| | | | |
|---|---|---|---|
| 9,223,006 B2 | 12/2015 | Kotzor et al. | |
| 9,584,969 B2* | 2/2017 | Yiu | ........ H04W 24/10 |
| 2004/0120550 A1* | 6/2004 | Comaniciu | ........ G06T 7/20 |
| | | | 382/107 |
| 2008/0309556 A1 | 12/2008 | Hohl | |
| 2014/0324339 A1* | 10/2014 | Adam | ........ G01S 13/726 |
| | | | 701/519 |
| 2016/0082597 A1* | 3/2016 | Gorshechnikov | ........ B25J 9/1664 |
| | | | 700/253 |
| 2019/0120633 A1* | 4/2019 | Afrouzi | ........ G05D 1/027 |
| 2020/0064446 A1 | 2/2020 | Chan et al. | |
| 2020/0171653 A1* | 6/2020 | Holson | ........ G05D 1/0246 |
| 2020/0225053 A1* | 7/2020 | Rus | ........ B60W 60/0015 |

OTHER PUBLICATIONS

Gaussian Sum Filters for Space Surveillance: Theory and Simulations ; Joshua T. Horwood,* Nathan D. Aragon, † and Aubrey B. Poore; Journal of Guidance, Control, and Dynamics; vol. 34, No. 6, Nov.-Dec. 2011.*

A. Torres-González et al., "Efficient Robot-Sensor Network Distributed SEIF Range-Only SLAM," IEEE International Conference on Robotics & Automation, 2014, pp. 1319-1326.

(Continued)

*Primary Examiner* — Joseph Arevalo
(74) *Attorney, Agent, or Firm* — Rabin & Berdo, P.C.

(57) ABSTRACT

Provided is a node location tracking method, including an initial localization step of estimating initial locations of a robot and neighboring nodes using inter-node measurement and a Sum of Gaussian (SoG) filter, wherein the initial localization step includes an iterative multilateration step of initializing the locations of the nodes; and a SoG filter generation step of generating the SoG filter.

9 Claims, 15 Drawing Sheets

(56) References Cited

OTHER PUBLICATIONS

G. Vallicrosa et al., "AUV Single Beacon Range-Only SLAM with a SOG Filter," IFAC—PapersOnLine, 2015, vol. 48, Issue 2, pp. 26-31.
Jose-Luis Blanco et al., "A Pure Probabilistic Approach to Range-Only SLAM," IEEE International Conference on Robotics and Automation, 2008, pp. 1436-1441.
Jose-Luis Blanco et al., "Efficient Probabilistic Range-Only SLAM," IEEE/RSJ International Conference on Intelligent Robots and Systems, 2008, pp. 1017-1022.
Joseph Djugash et al., "Range-Only SLAM for Robots Operating Cooperatively with Sensor Networks," Proceedings of the 2006 IEEE International Conference on Robotics and Automation, 2006, pp. 2078-2084.
N. M. Kwok et al., "Bearing-only SLAM Using a SPRT Based Gaussian Sum Filter," Proceedings of the 2005 IEEE International Conference on Robotics and Automation, 2005, pp. 1109-1114.

\* cited by examiner

FIG. 8

Algorithm 1: Weight update procedure

1    for $m \leftarrow 0$ to $M - 1, m \neq i, m \neq j$ do
2       for $k \leftarrow 0$ to $N - 1$ do
3          $d_{ij,m}^{k} = \|\mathbf{m}_{ij}^{k} - \mathbf{p}_m(n)\|$
4          $l_{ij,m}^{k} = \frac{1}{\sqrt{2\pi\sigma^2}} \exp\left(-\frac{(d_{ij,m}^{k} - d_{mj})^2}{2\sigma^2}\right)$
5       end
6       for $k \leftarrow 0$ to $N - 1$ do
7          $l_{ij,m}^{k} = \frac{l_{ij,m}^{k}}{\sum_k l_{ij,m}^{k}}$
8       end
9       for $k \leftarrow 0$ to $N - 1$ do
10          $w_{ij}^{k} = w_{ij}^{k} \times l_{ij,m}^{k}$
11       end
12       for $k \leftarrow 0$ to $N - 1$ do
13          $w_{ij}^{k} = \frac{w_{ij}^{k}}{\sum_k w_{ij}^{k}}$
14       end
15 end

FIG. 10

Algorithm 1: Efficient weight update procedure

1 for $m \leftarrow 0$ to $M - 1, m \neq i, m \neq j$ do
2     for $k \leftarrow 0$ to $N - 1$ do
3         $d_{ij,m}^k = \|\mathbf{m}_{ij}^k - \mathbf{p}_m(n)\|$
4         $l_{ij,m}^k = \frac{1}{\sqrt{2\pi\sigma^2}} \exp\left(-\frac{(d_{ij,m}^k - d_{mj})^2}{2\sigma^2}\right)$
5         $w_{ij}^k = w_{ij}^k \times l_{ij,m}^k$
6     end
7 end
8 for $k \leftarrow 0$ to $N - 1$ do
9     $w_{ij}^k = \frac{w_{ij}^k}{\sum_k w_{ij}^k}$
10 end
11 for $k \leftarrow 0$ to $N - 1$ do
12     $r = \mathrm{mod}(k + N/2, N)$
13     $w_{ji}^r = w_{ij}^k$
14 end

NODE LOCATION TRACKING METHOD

CROSS-REFERENCE TO RELATED APPLICATION

This application claims priority to Korean Patent Application No. 10-2020-0021369, filed on Feb. 21, 2020, and all the benefits accruing therefrom under 35 U.S.C. § 119, the contents of which in its entirety are herein incorporated by reference.

BACKGROUND

1. Field

The present disclosure relates to a node location tracking method, and more particularly, to a node location tracking method for tracking a node's location without moving a robot.

2. Description of the Related Art

Location recognition technology in sensor network environments is technology that estimates relative positions using information such as distances or angles from a known location, and calculates the locations of nodes using them.

Common methods for measuring locations in sensor network environments come in a variety of technologies, for example, methods using infrared, ultrasound, Radio Frequency Identification (RFID), Ultra WideBand (UWB), Received Signal Strength Indication (RSSI), camera sensors and light.

Among the above-described technologies, the location measurement technology using the RSSI of the sensor nodes is not easy to use due to abrupt changes in RSSI depending on the characteristics of surrounding environments. To measure the distance using the irregular RSSI values, many studies are being performed.

Additionally, to detect the locations of the nodes, event detection, location awareness dependent computing and geographic tracking are necessary. There are many studies on reliability and data robustness from the point of view of sensor networks, but for location awareness, methods and systems for ensuring confidence of the received signals are challenging.

The traditional location tracking algorithms keep track of the locations of neighboring nodes by moving a robot. The location tracking by the robot's movement is affected by both odometry errors and measurement errors.

Additionally, such location tracking algorithms are applied only when neighboring nodes are in a static state.

SUMMARY

The present disclosure is directed to providing a node location tracking method for tracking a node's location without moving a robot.

The present disclosure is further directed to providing a node location tracking method for tracking a location using signal information between a robot and neighboring nodes as well as signal information between neighboring nodes.

To solve the above-described problem, a node location tracking method of the present disclosure includes an initial localization step of estimating initial locations of a robot and neighboring nodes using inter-node measurement and a Sum of Gaussian (SoG) filter, wherein the initial localization step includes an iterative multilateration step of initializing the locations of the nodes, and a SoG filter generation step of generating the SoG filter.

The iterative multilateration step may include initializing the locations of first three nodes to $P_0(n)=(x_0(n), y_0(n))=(0, 0)$, $P_1(n)=(x_1(n), y_1(n))=(d_{01}, 0)$, $P_2(n)=(x_2(n), y_2(n))=\{(d_{01}^2+d_{02}^2+d_{03}^2)/x_1(n), \sqrt{(d_{02}^2-x_2^2(n))}\}$, and the location of other node may be initialized by the following Equation:

$$p_m(n) = (x_m(n), y_m(n))$$
$$= \left( \frac{d_{01}^2 + d_{0m}^2 - d_{1m}^2}{2x_1(n)}, \pm \sqrt{d_{0m}^2 - x_m^2(n)} \right)$$

Here, m is an index of the node other than the three nodes and is an integer of 3 or greater, $d_{01}$ is a distance between the $0^{th}$ node and the first node, $d_{0m}$ is a distance between the $0^{th}$ node and the $m^{th}$ node, and $d_{1m}$ is a distance between the first node and the $m^{th}$ node.

According to an example related to the present disclosure, the generation of the SoG filter may be performed by generating a mean $m^k_{ij}$, a covariance $C^k_{ij}$, and a weight $w^k_{ij}$ of the filter, $$m^k_{ij} = \begin{bmatrix} x_i(n) + d_{ij}\cos\left(\frac{2\pi k}{N}\right) \\ y_i(n) + d_{ij}\sin\left(\frac{2\pi k}{N}\right) \end{bmatrix},$$

$$C^k_{ij} = \begin{bmatrix} v_r & v_t \end{bmatrix} \begin{bmatrix} \sigma_r^2 & 0 \\ 0 & \sigma_t^2 \end{bmatrix} \begin{bmatrix} v_r^T \\ v_t^T \end{bmatrix}, w^k_{ij} = \frac{1}{N},$$

where Vr is a radial unit vector, Vt is a tangential unit vector, $\sigma_r^2$ is a radial distribution, $\sigma_t^2$ is a tangential distribution, and N is the number of Gaussian distributions.

The initial localization step may further include a SoG filter updating step that is performed by updating the weight, and the SoG filter updating step may include computing a likelihood $l_{ij,m}^k$ using a measured distance $d_{mj}$ obtained from the neighboring nodes, and subsequently updating the weight $w^k_{ij}$ using the likelihood $l_{ij,m}^k$.

The initial localization step may further include a SoG filter merging step of merging a plurality of SoG filters of the neighboring nodes to generate a Gaussian distribution, and the SoG filter merging step may be performed using [Equation 1] to [Equation 3]:

$$p_i(n+1) = \frac{1}{\sum_{j,k}(w^k_{ji})} \sum_{j,k} (w^k_{ji} m^k_{ji}) \quad \text{[Equation 1]}$$

$$C_i(n+1) = \frac{1}{\sum_{j,k}(w^k_{ji})} \sum_{j,k} w^k_{ji}(C^k_{ji} + \overline{C}^k_{ji}) \quad \text{[Equation 2]}$$

$$\overline{C}^k_{ji} = (m^k_{ji} - p_i(n+1))(m^k_{ji} - p_i(n+1))^T \quad \text{[Equation 3]}$$

In [Equation 1] to [Equation 3], $P_i(n+1)$ denotes an estimated location of the $i^{th}$ node at the $n+1^{th}$ iteration, $m^k_{ij}$ denotes a mean of the filter, $w^k_{ji}$ denotes the weight, $C_i(n+1)$ denotes a covariance of the node newly estimated by the SoG filter merging step, and $\overline{C}^k_{ij}$ denotes covariance of $m^k_{ij}$.

The initial localization step may further include a weight transfer step of transferring a maximum weight to its surrounding weights with respect to an index $k_{max}$ having the maximum weight in the SoG filter distribution using [Equation 4] and [Equation 5]:

$$d_{k_{max}-k} = \left\| m_{ij}^{k_{max}} - m_{ij}^k \right\|$$ [Equation 4]

$$w_{ij}^k = \frac{1}{\sqrt{2\pi\sigma^2}} \exp\left(-\frac{d_{k_{max}-k}^2}{2\sigma^2}\right)$$ [Equation 5]

In [Equation 4] and [Equation 5], $d_{k_{max}-k}$ denotes a distance between $m_{ij}^{k_{max}}$ and $m_{ij}^k$, $m_{ij}^{k_{max}}$ is a mean of the SoG filter having the maximum weight, and $\sigma$ is a spread of the Gaussian distribution, and may be, for example, 3.

According to another example related to the present disclosure, the node location tracking method of the present disclosure may further include a movement based tracking step of estimating the location or movement of the neighboring nodes more accurately using movement of the robot from the initial position value of the robot or the neighboring nodes estimated in the initial localization step.

The movement based tracking step may include a SoG filter resetting step, a SoG filter updating step, a SoG filter merging step and a weight transfer step.

BRIEF DESCRIPTION OF THE DRAWINGS

FIG. 8 is an algorithm showing a SoG filter updating step.

FIG. 10 is an algorithm showing a SoG filter updating step.

DETAILED DESCRIPTION

Hereinafter, the disclosed embodiments will be described in detail with reference to the accompanying drawings, and identical or similar elements are given identical or similar reference signs and redundant descriptions are omitted herein. As used herein, the suffix "unit" is only given or used to ease the drafting of the specification, and does not have any meaning or role for identifying itself. Additionally, in describing the embodiments disclosed herein, when it is determined that a certain detailed description of relevant known technology may make the key subject matter of the disclosed embodiments ambiguous, the detailed description is omitted herein. Additionally, the accompanying drawings are provided for an easy understanding of the disclosed embodiments, and the technical spirit disclosed herein is not limited by the accompanying drawings, and it should be understood that the present disclosure covers all modifications, equivalents or alternatives falling in the spirit and technical scope of the present disclosure.

The terms "first", "second", and the like may be used to describe various elements, but the elements are not limited by the terms. These terms are used to distinguish one element from another.

It will be understood that when an element is referred to as being "connected to" another element, the element can be connected to the other element, but intervening elements may be present.

Unless the context clearly indicates otherwise, the singular forms include the plural forms as well.

It should be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Figure 1:
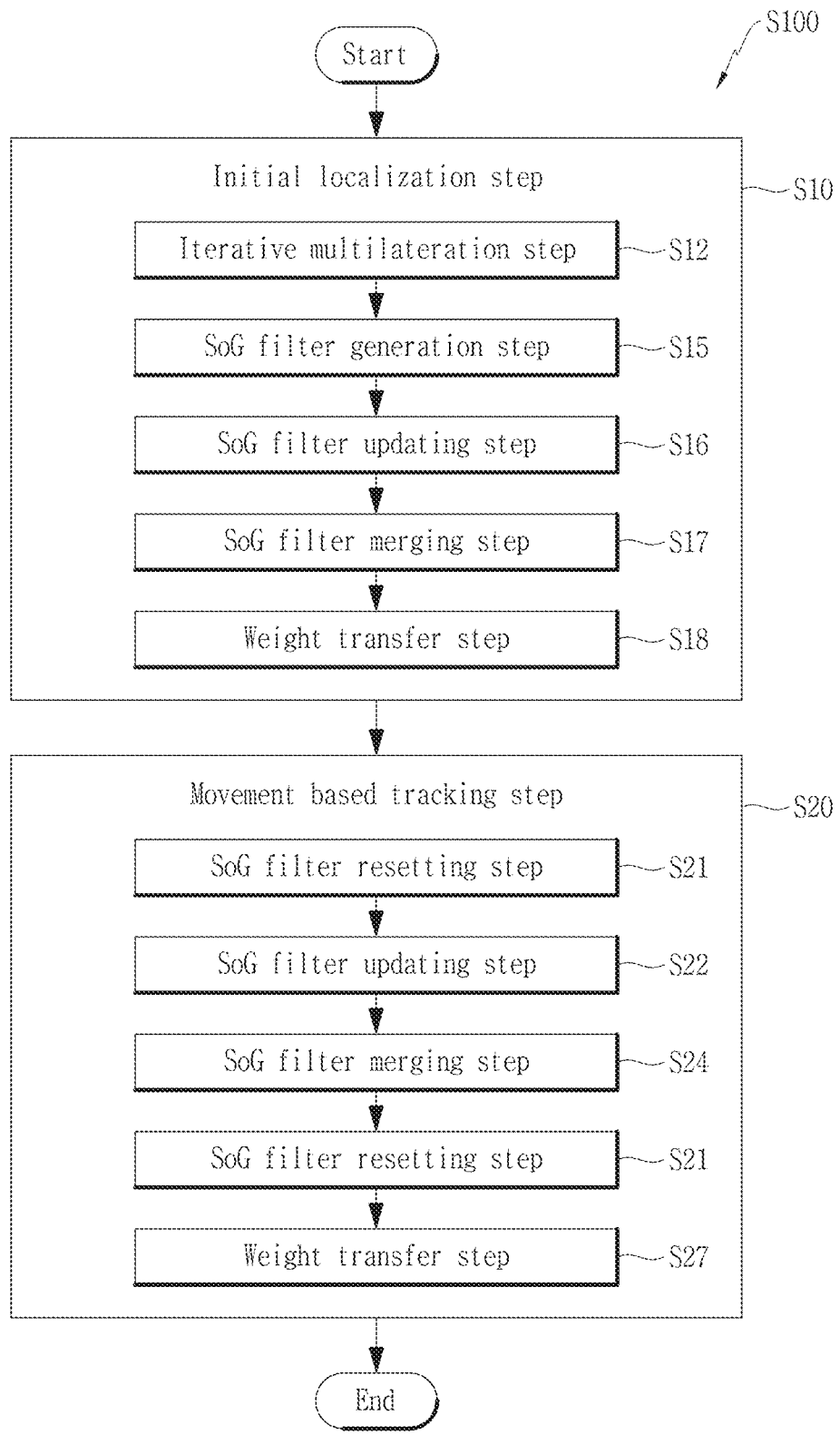
FIG. 1 is a flowchart showing a node location tracking method of the present disclosure.
Figure 2:
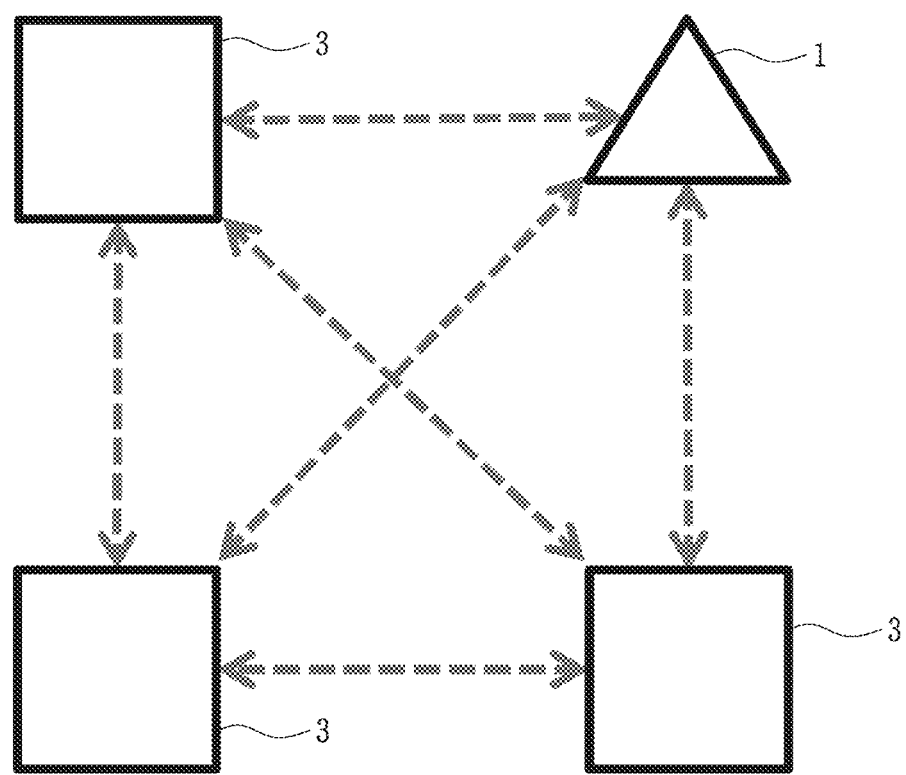
FIG. 2 is a conceptual diagram showing a relationship between a robot and neighboring nodes in a node location tracking method of the present disclosure.
Figure 3:
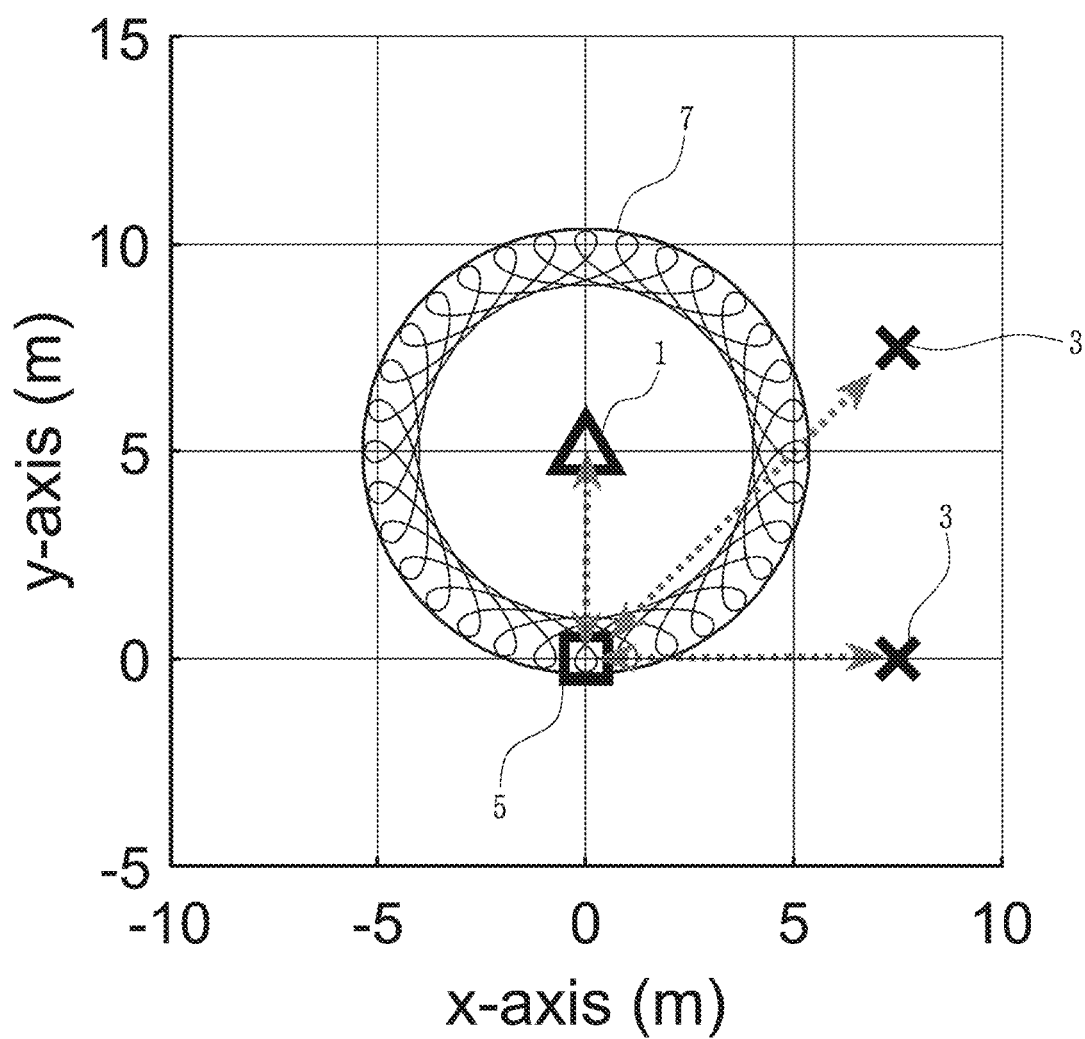
FIG. 3 is a graph showing a relationship between a robot, a receiver and neighboring nodes in a node location tracking method of the present disclosure.

FIG. 1 is a flowchart showing a node location tracking method S100 of the present disclosure, FIG. 2 is a conceptual diagram showing a relationship between a robot 1 and neighboring nodes 3 in the node location tracking method S100 of the present disclosure, and FIG. 3 is a graph showing a relationship between the robot 1, a receiver 5 and the neighboring nodes 3 in the node location tracking method S100 of the present disclosure.

Hereinafter, the node location tracking method S100 of the present disclosure will be described with reference to FIGS. 1 to 3.

Referring to FIG. 1, the node location tracking method S100 of the present disclosure includes an initial localization step S10.

Referring to FIG. 2, as opposed to the traditional location tracking methods, the node location tracking method S100 of the present disclosure tracks the location using measurement information between the robot 1 and the neighboring nodes 3 as well as measurement information between the neighboring nodes 3. Accordingly, it is possible to track the movement of the robot 1 and the neighboring nodes 3 using the measurement information between the neighboring nodes 3. Additionally, in FIG. 2, the two-way arrows indicate that the measurement information is provided between the nodes 3 and between the robot 1 and the nodes 3.

Additionally, referring to FIG. 3, in the node location tracking method S100 of the present disclosure, the receiver 5 (or a receiver node) tracks the location upon receiving the measurement information from not only the robot 1 but also the neighboring nodes 3.

In the initial localization step S10, the initial locations of the robot 1 and the neighboring nodes 3 are estimated using inter-node measurement and a Sum of Gaussian (SoG) filter.

The initial localization step S10 may include an iterative multilateration step S12 for initializing the location of the node.

The initialization in the iterative multilateration step S12 may be understood as initial estimation of node location.

$P_i(n)$ denotes the estimated location of the $i^{th}$ node at the $n^{th}$ iteration, and $d_{ij}$ denotes the estimated distance between the $i^{th}$ node and the $j^{th}$ node.

For example, the locations of the first three nodes may be initialized to $P_0(n)=(x_0(n), y_0(n))=(0,0)$, $P_1(n)=(x_1(n), y_1(n))=(d_{01}, 0)$, $P_2(n)=(x_2(n), y_2(n))=\{(d_{01}^2+d_{02}^2+d_{03}^2)/x_1(n), \sqrt{(d_{02}^2-x_2^2(n))}\}$.

Subsequently, the location of the node other than the three nodes may be initialized to $P_m(n)$ of one of the following two candidates, in which $\hat{d}_{2m}=\|p_m(n)-p_2(n)\|$ is closer to the measurement $d_{2m}$.

$$p_m(n) = (x_m(n), y_m(n))$$
$$= \left( \frac{d_{01}^2 + d_{0m}^2 - d_{1m}^2}{2x_1(n)}, \pm\sqrt{d_{0m}^2 - x_m^2(n)} \right)$$

$\hat{d}_{2m}$ is the initialized distance between the location $p_n(n)$ of the $m^{th}$ node and the location $p_2(n)$ of the second node. Here, m is an index of the node other than the three nodes, and may be understood as an integer of 3 or greater.

Additionally, $d_{01}$ may be the distance between the $0^{th}$ node and the first node, $d_{0m}$ may be the distance between the $0^{th}$ node and the $m^{th}$ node, and $d_{1m}$ may be the distance between the first node and the $m^{th}$ node.

Figure 4A:
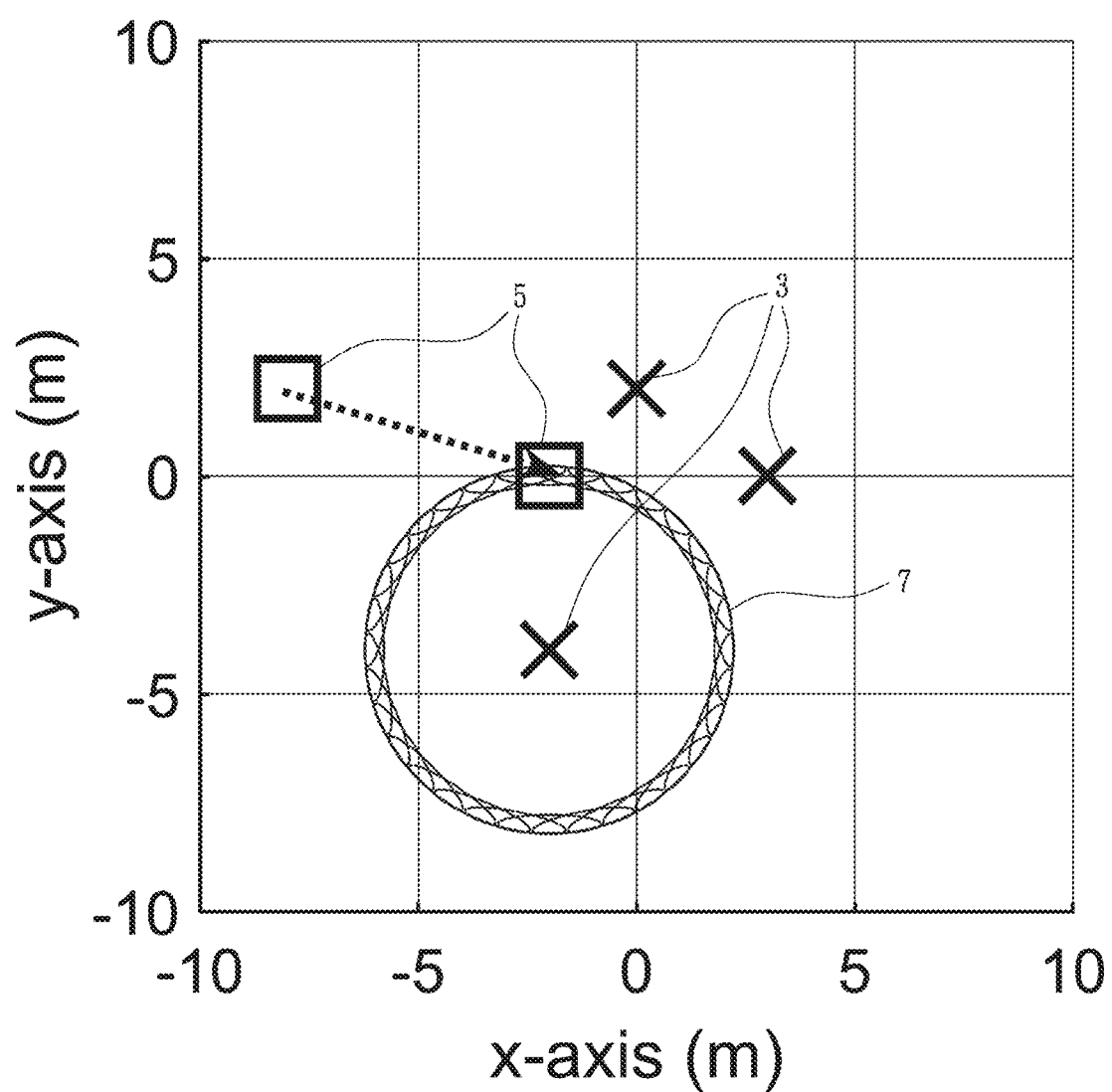
FIG. 4A is a graph showing a Sum of Gaussian (SoG) filter resetting step.
Figure 4B:
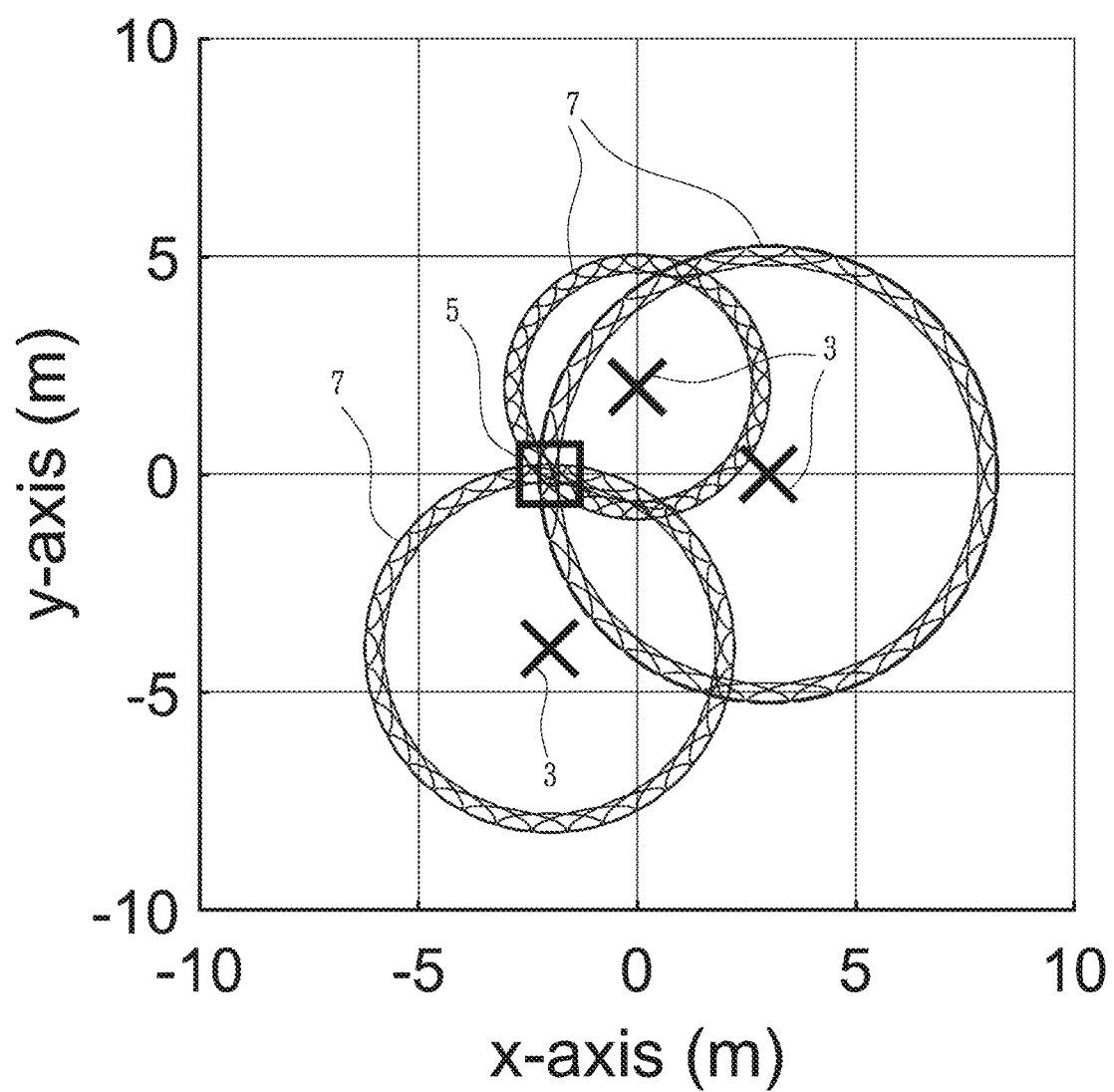
FIG. 4B is a graph showing a SoG filter updating and merging step.
Figure 4C:
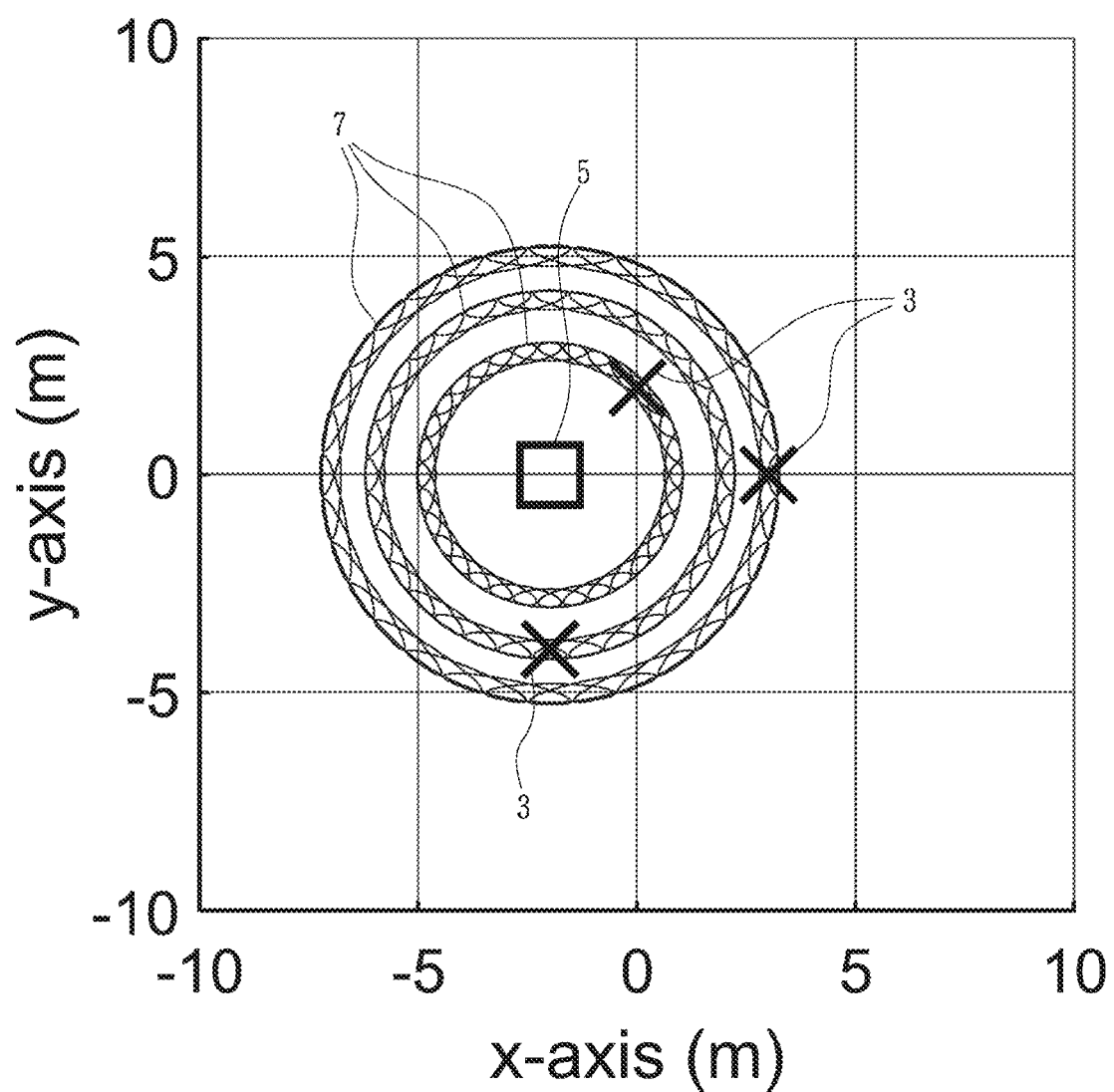
FIG. 4C is a graph showing a SoG filter resetting and updating step.

FIG. 4A is a graph showing a SoG filter resetting step S21, FIG. 4B is a graph showing a SoG filter updating step S16 and a SoG filter merging step S17, and FIG. 4C is graph showing a SoG filter resetting step S21 and a SoG filter updating step S16.

Hereinafter, a SoG filter generation step S15, a SoG filter updating step S16 and a SoG filter merging step S17 of the present disclosure will be described with reference to FIGS. 4A to 4C.

Referring to FIG. 1, the initial localization step S10 may further include a SoG filter generation step S15, a SoG filter updating step S16, a SoG filter merging step S17 and a weight transfer step S18.

The SoG filter generation step S15 may be performed by generating the mean $m^k_{ij}$, the covariance $C^k_{ij}$ and the weight $w^k_{ij}$ of the filter.

$$m^k_{ij} = \begin{bmatrix} x_i(n) + d_{ij}\cos\left(\frac{2\pi k}{N}\right) \\ y_i(n) + d_{ij}\sin\left(\frac{2\pi k}{N}\right) \end{bmatrix},$$

$$C^k_{ij} = \begin{bmatrix} v_r & v_t \end{bmatrix} \begin{bmatrix} \sigma_r^2 & 0 \\ 0 & \sigma_t^2 \end{bmatrix} \begin{bmatrix} v_r^T \\ v_t^T \end{bmatrix}, \quad w^k_{ij} = \frac{1}{N}.$$

Here, Vr denotes a radial unit vector, Vt denotes a tangential unit vector, $\sigma_r^2$ denotes a radial distribution, $\sigma_t^2$ denotes a tangential distribution, and N denotes the number of Gaussian distributions. N may be defined by the user's settings in each node.

FIG. 3 may be understood as a graph about the SoG filter generation step S15, and shows the measured distance of the robot 1 and the receiver 5.

Figure 5A:
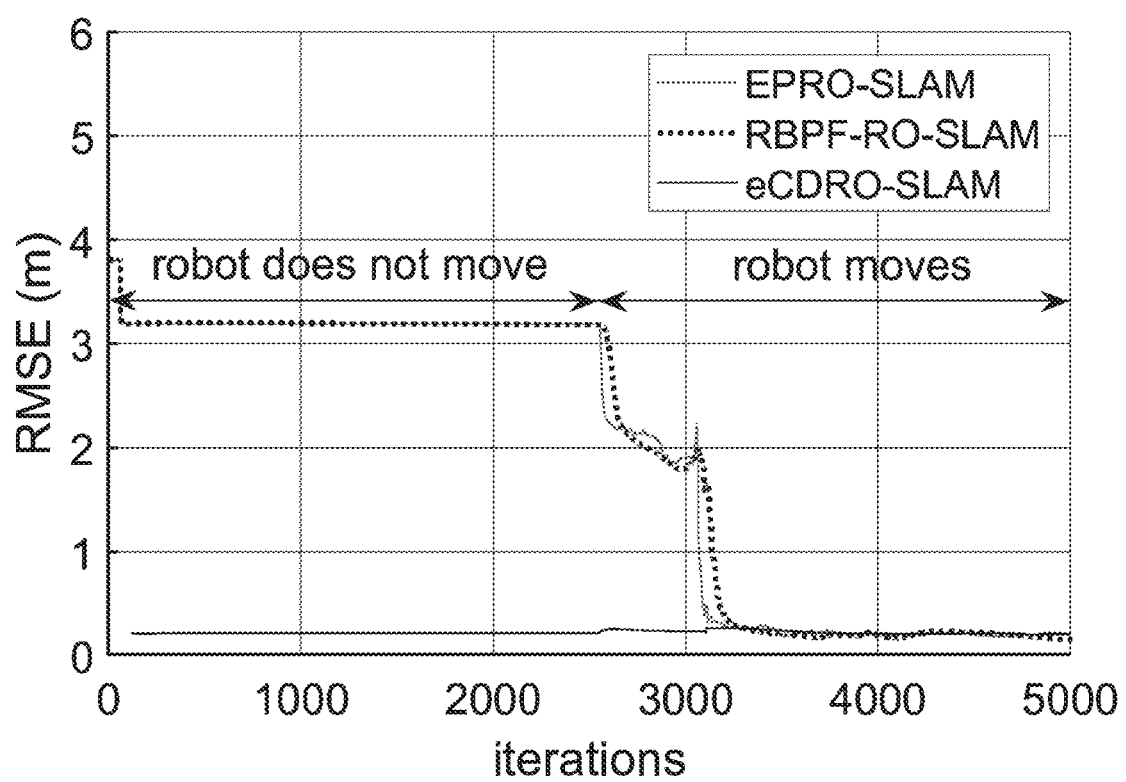
FIG. 5A is a graph showing the results of Experiment 1 about position error performance of a node location tracking method of the present disclosure and different methods.
Figure 5B:
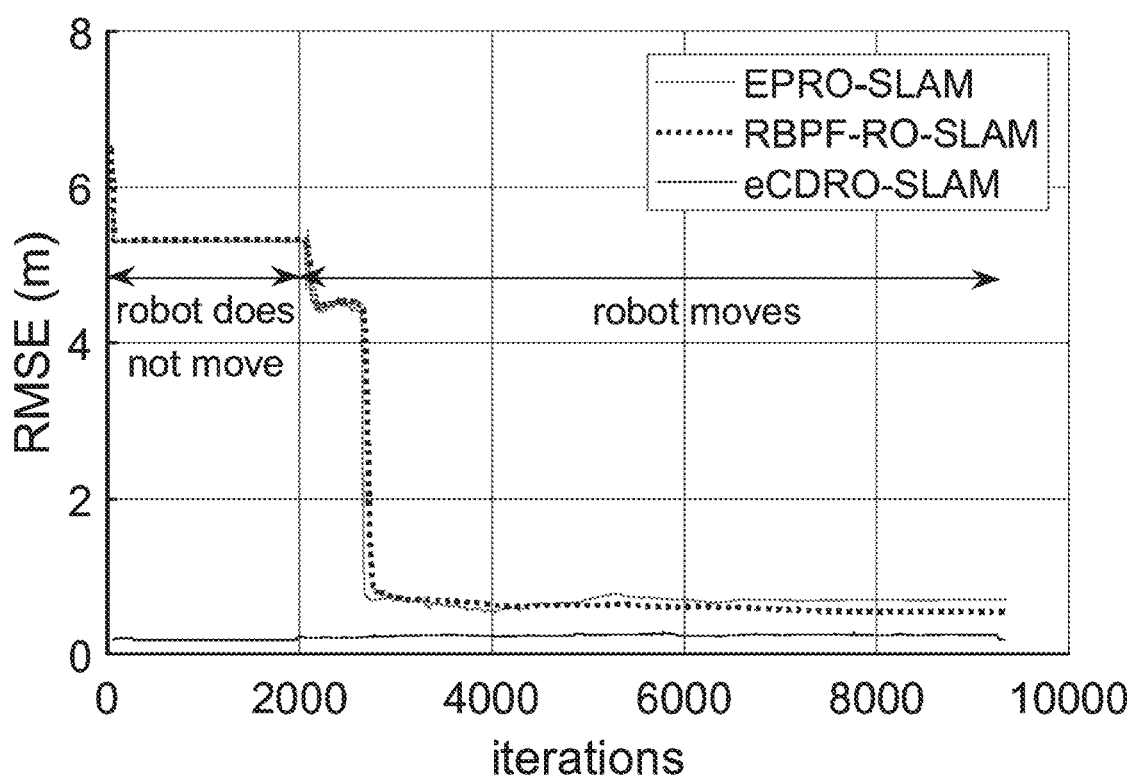
FIG. 5B is a graph showing the results of Experiment 2 about position error performance of a node location tracking method of the present disclosure and different methods.

FIG. 5A is a graph showing the results of Experiment 1 about position error performance of the node location tracking method S100 of the present disclosure and other methods, and FIG. 5B is a graph showing the results of Experiment 2 about position error performance of the node location tracking method S100 of the present disclosure and other methods.

Experiment 1 of FIG. 5A is conducted in an area of 3.6 m×4.8 m, and Experiment 2 of FIG. 5B is conducted in an area of 6.6 m×8.4 m.

In FIGS. 5A and 5B, the node location tracking method S100 of the present disclosure is efficient Cooperative Dynamic Range Only (eCDRO)-Simultaneous Localization and Mapping (SLAM). Additionally, in FIGS. 5A and 5B, EPRO-SLAM and RBPF-RO-SLAM may be understood as the traditional location tracking method. In FIGS. 5A and 5B, it can be understood that the location tracking method S100 (eCDRO-SLAM) of the present disclosure has a low position error when the robot moves, and even when the robot does not move.

Figure 6:
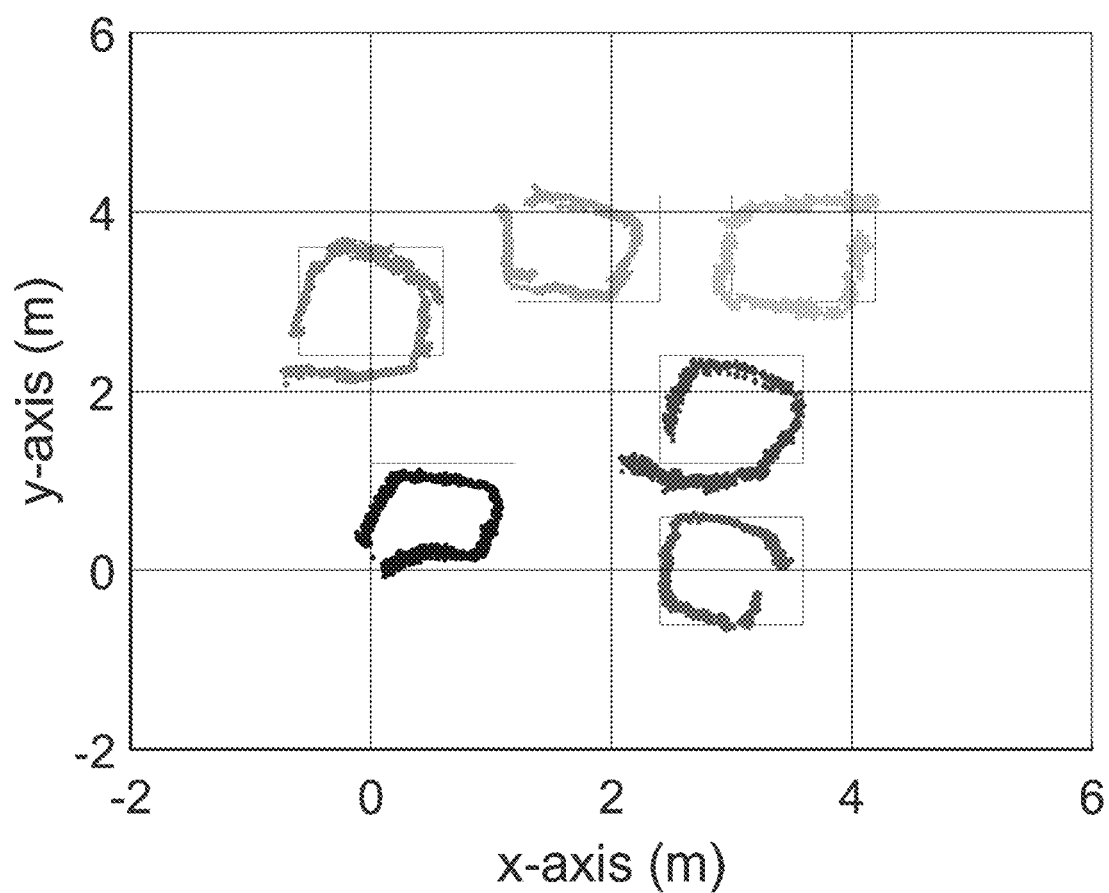
FIG. 6 is a graph showing node movements in a node location tracking method of the present disclosure.

FIG. 6 is a graph showing node movements in the node location tracking method S100 of the present disclosure, and shows an example in which each node moves near the square of 1 m to 2 m.

Figure 7:
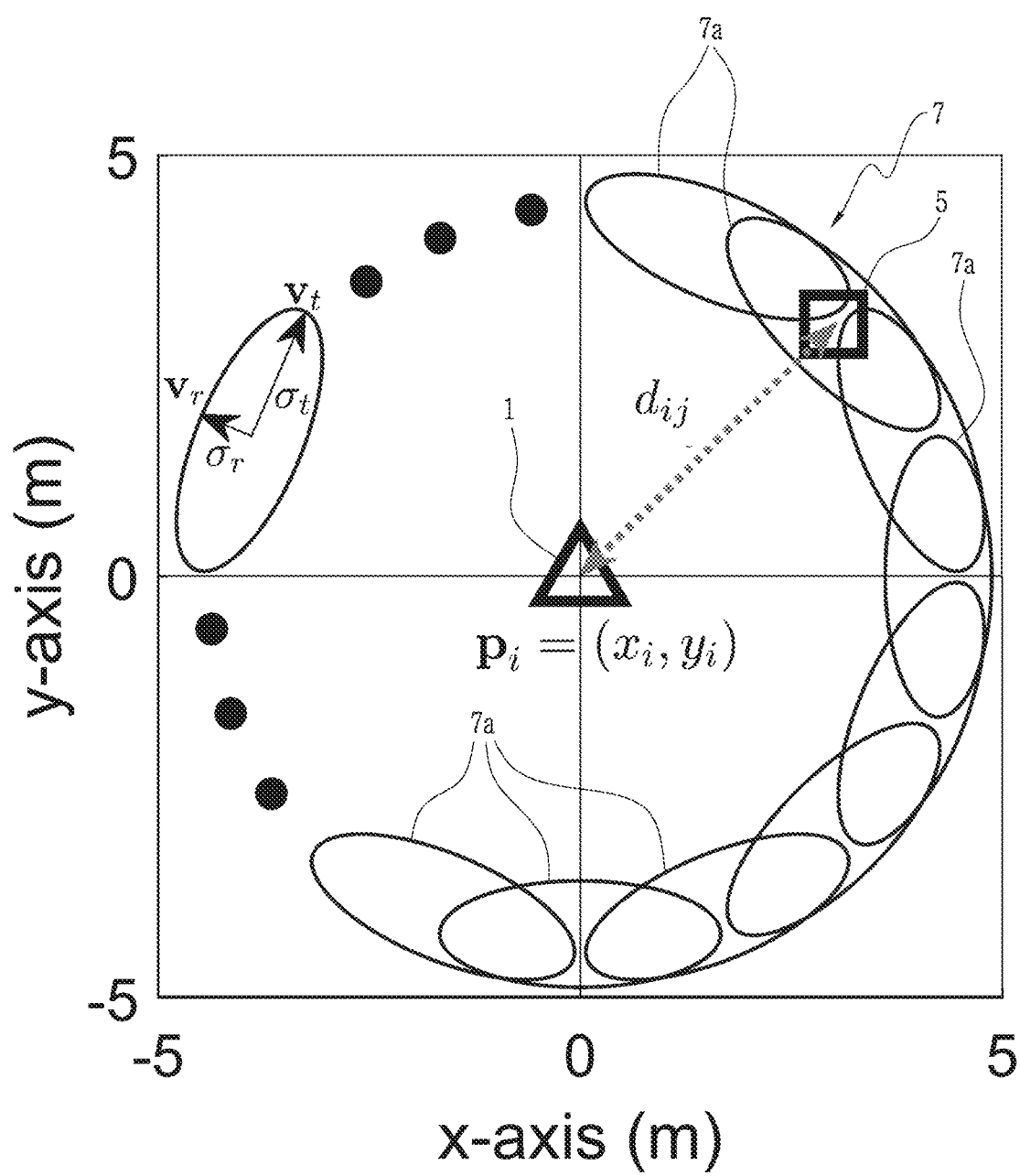
FIG. 7 is a graph showing a SoG filter generation step.

FIG. 7 is a graph showing the step S15 of generating the SoG filter 7. Describing the SoG filter 7 with reference to FIG. 7, FIG. 7 shows a plurality of ellipses 7a, and the SoG filter 7 may be understood as a set of ellipses 7a. Each ellipse 7a is a Gaussian indicating a probability distribution associated with the location of the node. The SoG filter 7 may be understood as a set of Gaussians. The shape of Gaussian of the SoG filter 7 is not necessarily limited to the elliptical shape.

The mean $m^k_{ij}$ denotes the center of the ellipses 7a in FIG. 7, the covariance $C^k_{ij}$ denotes the extent to which each ellipse 7a spreads wide, and the weight $w^k_{ij}$ denotes the number of ellipses 7a.

The accuracy of the initialized location in the Iterative multilateration may be improved by the SoG filter generation step S15.

The SoG filter updating step S16 may be performed by performing weight updates. The SoG filter updating step S16 is shown in FIGS. 4B and 4C. In the weight updates, the likelihood is computed using the measured distance $d_{mj}$, obtained from the neighboring nodes, and subsequently, the weight $w^k_{ij}$ is updated using the likelihood $l_{ij,m}^k$. Here, m denotes an index of the neighboring nodes, and k denotes an index of the SoG filter node.

FIG. 8 shows an algorithm showing the SoG filter updating step S16.

FIG. 8 shows an example of computing the likelihood $l_{ij,m}^k$ using the measured distance $d_{mj}$, obtained from the neighboring nodes, and subsequently, updating the weight $w^k_{ij}$ using the likelihood $l_{ij,m}^k$.

In the algorithm of FIG. 8, in the third line, $d_{ij,m}^k$ may be a vector indicating the distance between and $m_{ij}^k$ and $p_m(n)$. $m_{ij}^k$ is a vector indicating the mean distance between the $i^{th}$ node and the $j^{th}$ node in the Gaussian k index, and $p_m(n)$ is a vector indicating the location at the $m^{th}$ node.

In the fourth line, the likelihood $l_{ij,m}^k$ is computed, $d_{mj}$ denotes the distance between the $m^{th}$ node and the $j^{th}$ node, and σ is the user parameter, and may be, for example, 3.

In the second to fifth lines, the likelihood $l_{ij,m}^k$ is computed based on $d_{ij,m}^k$ value.

As shown in the sixth to eighth lines, the likelihood $l_{ij,m}^k$ is normalized.

As shown in the ninth to eleventh lines, the likelihood $l_{ij,m}^k$ is multiplied by the weight $w^k_{ij}$, and as shown in the twelfth to fourteenth lines, the weight $w^k_{ij}$ for the likelihood is normalized.

In the present disclosure, the SoG filter updating step S16 only relies on the measurement rate, thereby achieving fast weight convergence.

In the SoG filter updating step S16, the mean and the covariance of the filter may be updated using an Extended Kalman Filter (EKF) before the weight updates. The EKF is well known in the art, and its detailed description is omitted herein.

Figure 9A:
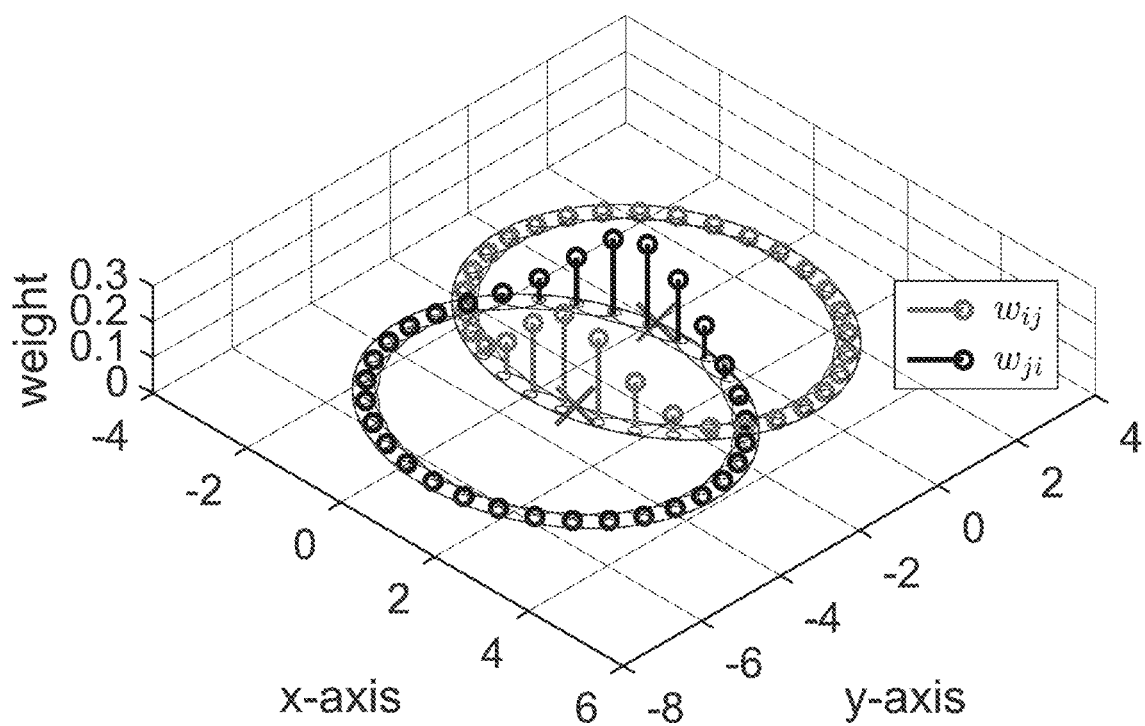
FIGS. 9A and 9B are graphs showing a weight distribution between two nodes.
Figure 9B:
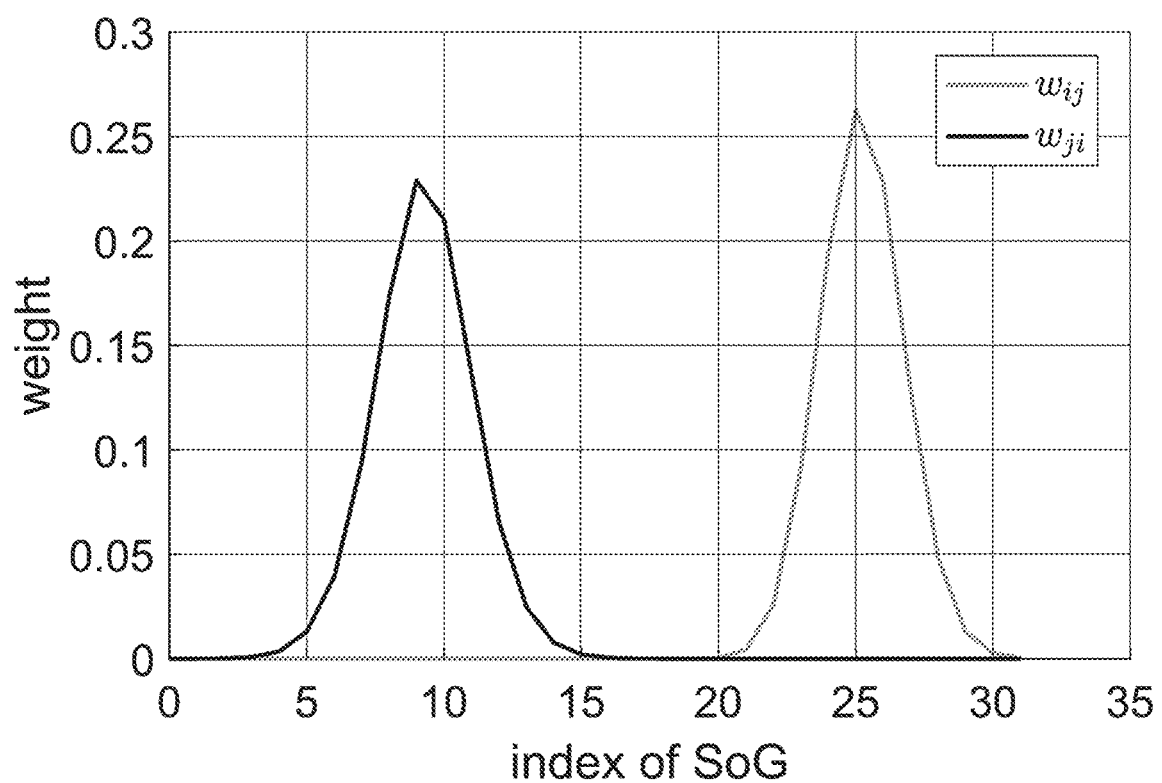

FIGS. 9A and 9B are graphs showing a weight distribution between two nodes.

The weight distribution between two nodes has a symmetric property as shown in FIGS. 9A and 9B. Accordingly, after $w^k_{ij}$ is computed, the same value as $w^k_{ij}$ may be applied using the modular operation, and since $w^k_{ij}$ is not separately computed, it is possible to update the weight with half the computational amount.

FIG. 10 is an algorithm showing the SoG filter updating step S16.

In the algorithm of FIG. 10, referring to the eleventh to fourteenth lines, mod is the modular operation and may find an index of $w^k_{ji}$ corresponding to the index k of $w^k_{ij}$. Additionally, the same value as $w^k_{ij}$ may be applied without needing to calculating $w^k_{ij}$, thereby reducing the required computational amount by half.

In the SoG filter merging step S17, the plurality of SoG filters of the neighboring nodes is merged into a Gaussian distribution using the following [Equation 1] to [Equation 3] to estimate the location of the node.

$$p_i(n+1) = \frac{1}{\sum_{j,k}(w^k_{ji})} \sum_{j,k}(w^k_{ji} m^k_{ji})$$ [Equation 1]

Here, $p_i(n+1)$ is the location of the node newly estimated by the SoG filter merging step S17.

$$\overline{C}^k_{ji} = (m^k_{ji} - p_i(n+1))(m^k_{ji} - p_i(n+1))^T$$ [Equation 2]

Here, $\overline{C}^k_{ji}$ denotes the covariance of $m^k_{ji}$.

$$C_i(n+1) = \frac{1}{\sum_{j,k}(w^k_{ji})} \sum_{j,k} w^k_{ji}(C^k_{ji} + \overline{C}^k_{ji})$$ [Equation 3]

Here, $C_i(n+1)$ is the covariance of the node newly estimated by the SoG filter merging step S17.

Additionally, in the SoG filter merging step S17, Gaussian distribution having a low weight $w^k_{ij}$ is not included in the computation, thereby achieving efficient computation. For example, under the condition of $|w^k_{ij}| < \epsilon$, $\epsilon = 0.00001/N$, Gaussian distribution having a low weight $w^k_{ij}$ may be not included in the computation.

Due to non-convexity of anchor-free localization, a local solution may be obtained after the SoG filter merging step S17, and to resolve the non-convexity, the weight transfer step S18 may be performed.

In the weight transfer step S18, the maximum weight may be transferred to its surrounding weights with respect to the index $k_{max}$ having the maximum weight in SoG filter distribution using [Equation 4] and [Equation 5].

$$d_{k_{max}-k} = \|m^{k_{max}}_{ij} - m^k_{ij}\|$$ [Equation 4]

$$w^k_{ij} = \frac{1}{\sqrt{2\pi\sigma^2}} \exp\left(-\frac{d^2_{k_{max}-k}}{2\sigma^2}\right)$$ [Equation 5]

In [Equation 4] and [Equation 5], $d_{k_{max}-k}$ denotes the distance between $m^{k_{max}}$ and $m^k_{ij}$, $m^{k_{max}}_{ij}$ denotes the mean of the SoG filter having the maximum weight, and $\sigma$ is the spread of the Gaussian distribution, and may be, for example, 3.

Figure 11:
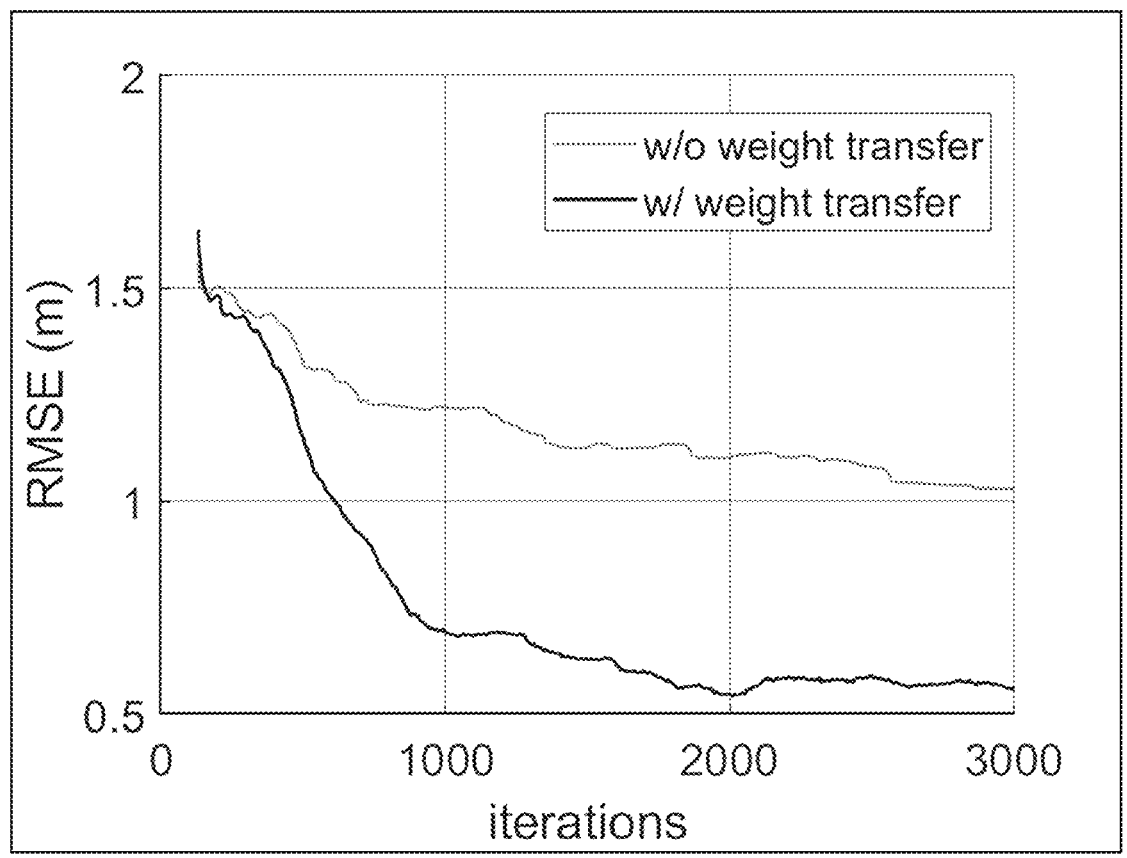
FIG. 11 is a graph showing a comparison of performance with/without a weight transfer step.

FIG. 11 is a graph showing a comparison of performance with/without the weight transfer step S18.

Referring to FIG. 11, a position error of improved high probability may be obtained by performing the weight transfer step S18. In FIG. 11, the blue line indicates a position error when the weight transfer step S18 is not performed, and the red line indicates a position error when the weight transfer step S18 is performed.

The node convergence determination process includes calculating an average location of nodes, and determining whether the nodes are converged.

The average location of nodes may be calculated by [Equation 6].

$$\tilde{p}_i(n+1) = \alpha \tilde{p}_i(n) + (1-\alpha) p_i(n)$$ [Equation 6]

Here, $\tilde{p}_i(n)$ denotes the average location of nodes, and a may be a value close to 1, and denotes, for example, a value between 0.9 and 0.95.

The node convergence determination process may be performed by [Equation 7].

$$\|\tilde{p}_i(n+1) - \tilde{p}_i(n)\| < \epsilon$$ [Equation 7]

Here, $\epsilon$ may be $10^{-4}$ to $10^{-3}$.

When the condition of [Equation 7] is satisfied, the corresponding node is determined to be converged, and when the condition of [Equation 7] is not satisfied, the location of the corresponding node may be continually estimated upon receipt of newly measured location information. When all the nodes are converged, the procedure is shifted to the moving step.

The node location tracking method S100 of the present disclosure may further include a movement based tracking step S20.

In the movement based tracking step S20, the locations or the movements of the neighboring nodes 3 are estimated more accurately using the movement of the robot 1 from the initial position values of the robot 1 and the neighboring nodes 3 estimated in the initial localization step S10, and the movement based tracking step S20 may be performed after the initial localization step S10.

Referring to FIG. 1, the movement based tracking step S20 may include a SoG filter resetting step S21, a SoG filter updating step S22, a SoG filter merging step S24 and a weight transfer step S27.

Additionally, the movement based tracking step S20 may comprise the plurality of steps included in the initial localization step S10.

In the SoG filter resetting step S21 of resetting the SoG filter 7 generated in FIG. 3 or FIG. 7, resetting is performed based on the changed position value of the receiver 5 or the robot 1 by the location movement of the receiver or the robot 1.

Referring to FIG. 4A, shown is an example of the step of resetting the SoG filter 7 by the movement of the receiver 5.

In the movement based tracking step S20, the SoG filter updating step S22, the SoG filter merging step S24 and the weight transfer step S27 are performed in the same way as the SoG filter updating step S16, the SoG filter merging step S17 and the weight transfer step S18 in the initial localization step S10 as described above, and a reference is made to the description in the initial localization step S10 described previously.

The node location tracking method of the present disclosure is not affected by odometry errors, and is only affected by measurement errors, and accordingly, it is possible to minimize position errors, and achieve more accurate estimation irrespective of the size of the wireless network.

The node location tracking method of the present disclosure is only affected by measurement errors, thereby achieving fast node localization.

The node location tracking method of the present disclosure includes SoG filter updates, and thus it is possible to track the movements of the neighboring nodes, and it can be used in applications where node movements are necessary.

The method of the present disclosure may be used in applications where node movements are necessary, for example, location tracking of moving goods in the warehouse, search and rescue in disaster environments, activity analysis of humans or moving objects in ambient intelligence and autonomous underwater vehicle (AUV) systems in underwater environments.

The node location tracking method S100 of the present disclosure as described hereinabove is not limited to the configuration and method of the embodiments described above, and some or all the embodiments may be selectively combined to make various modification.

It is obvious to those skilled in the art that the present disclosure may be embodied in other particular forms without departing from the spirit and essential features of the present disclosure. Therefore, the above detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

What is claimed is:

1. A node location tracking method, comprising:
an initial localization step of estimating initial locations of a robot and neighboring nodes using inter-node measurement and a Sum of Gaussian (SoG) filter, and
a movement based tracking step of tracking a location or movement of the neighboring nodes using measurement information between the robot and the neighboring nodes and measurement information between the neighboring nodes,
wherein the initial localization step includes:
an iterative multilateration step of initializing the locations of the nodes; and
a SoG filter generation step of generating the SoG filter.

2. A node location tracking method, comprising:
an initial localization step of estimating initial locations of a robot and neighboring nodes using inter-node measurement and a Sum of Gaussian (SoG) filter,
wherein the initial localization step includes:
an iterative multilateration step of initializing the locations of the nodes; and
a SoG filter generation step of generating the SoG filter; and
wherein the iterative multilateration step comprises initializing the locations of a first three nodes to $P_0(n) = (x_0(n), y_0(n)) = (0,0)$, $P_1(n) = (x_1(n), y_1(n)) = (d_{01}, 0)$, $P_2(n) = (x_2(n), y_2(n)) = \{(d_{01}^2 + d_{02}^2 + d_{03}^2)/x_1(n), \sqrt{(d_{02}^2 - x_2^2(n))}\}$, and the location of another node is initialized by the following Equation:

$$p_m(n) = (x_m(n), y_m(n))$$

$$= \left( \frac{d_{01}^2 + d_{0m}^2 - d_{1m}^2}{2x_1(n)}, \pm \sqrt{d_{0m}^2 - x_m^2(n)} \right)$$

where m is an index of the node other than the three nodes and is an integer of 3 or greater, $d_{01}$ is a distance between a $0^{th}$ node and a first node, $d_{0m}$ is a distance between the $0^{th}$ node and an $m^{th}$ node, and $d_{1m}$ is a distance between the first node and the $m^{th}$ node.

3. A node location tracking method, comprising:
an initial localization step of estimating initial locations of a robot and neighboring nodes using inter-node measurement and a Sum of Gaussian (SoG) filter,
wherein the initial localization step includes:
an iterative multilateration step of initializing the locations of the nodes; and
a SoG filter generation step of generating the SoG filter; and
wherein the generation of the SoG filter is performed by generating a mean $m_{ij}^k$, a covariance $C_{ij}^k$, and a weight $w_{ij}^k$ of the filter, $$m_{ij}^k = \begin{bmatrix} x_i(n) + d_{ij}\cos\left(\frac{2\pi k}{N}\right) \\ y_i(n) + d_{ij}\sin\left(\frac{2\pi k}{N}\right) \end{bmatrix},$$

$$C_{ij}^k = \begin{bmatrix} v_r & v_t \end{bmatrix} \begin{bmatrix} \sigma_r^2 & 0 \\ 0 & \sigma_t^2 \end{bmatrix} \begin{bmatrix} v_r^T \\ v_t^T \end{bmatrix}, \; w_{ij}^k = \frac{1}{N},$$

where Vr is a radial unit vector, Vt is a tangential unit vector, $\sigma_r^2$ is a radial distribution, $\sigma_t^2$ is a tangential distribution, and N is a number of Gaussian distributions.

4. The node location tracking method according to claim 3, wherein the initial localization step further comprises a SoG filter updating step that is performed by updating the weight, and
the SoG filter updating step comprises computing a likelihood $l_{ij,m}^k$ using a measured distance $d_{mj}$ obtained from the neighboring nodes, and subsequently updating the weight $w_{ij}^k$ using the likelihood $l_{ij,m}^k$.

5. The node location tracking method according to claim 4, wherein the initial localization step further comprises a SoG filter merging step of merging a plurality of SoG filters of the neighboring nodes to generate a Gaussian distribution, and
the SoG filter merging step is performed using [Equation 1] to [Equation 3]:

$$p_i(n+1) = \frac{1}{\sum_{j,k}(w_{ji}^k)} \sum_{j,k}(w_{ji}^k m_{ji}^k) \quad \text{[Equation 1]}$$

$$C_i(n+1) = \frac{1}{\sum_{j,k}(w_{ji}^k)} \sum_{j,k} w_{ji}^k (C_{ji}^k + \overline{C}_{ji}^k) \quad \text{[Equation 2]}$$

$$\overline{C}_{ji}^k = (m_{ji}^k - p_i(n+1))(m_{ji}^k - p_i(n+1))^T \quad \text{[Equation 3]}$$

wherein in [Equation 1] to [Equation 3], $P_i(n+1)$ denotes an estimated location of an $i^{th}$ node at an $n+1^{th}$ iteration, $m^k_{ij}$ denotes a mean of the filter, $w^k_{ji}$ denotes the weight, $C_i(n+1)$ denotes a covariance of a node newly estimated by the SoG filter merging step, and $\overline{C}^k_{ji}$ denotes a covariance of $m^k_{ji}$.

6. The node location tracking method according to claim 5, further comprising:

a weight transfer step of transferring a maximum weight to surrounding weights with respect to an index $k_{max}$ having the maximum weight in the SoG filter distribution using [Equation 4] and [Equation 5]:

$$d_{k_{max}-k} = \left\| m^{k_{max}}_{ij} - m^k_{ij} \right\| \qquad \text{[Equation 4]}$$

$$w^k_{ij} = \frac{1}{\sqrt{2\pi\sigma^2}} \exp\left(-\frac{d^2_{k_{max}-k}}{2\sigma^2}\right) \qquad \text{[Equation 5]}$$

wherein in [Equation 4] and [Equation 5], $d_{k_{max}-k}$ denotes a distance between $m^{k_{max}}_{ij}$ and $m^k_{ij}$, $m^{k_{max}}_{ij}$ is a mean of the SoG filter having the maximum weight, and $\sigma$ is a spread of the Gaussian distribution.

7. The node location tracking method according to claim 2, further comprising:

a movement based tracking step of estimating the location or movement of the neighboring nodes using movement of the robot from the initial position value of the robot or the neighboring nodes estimated in the initial localization step.

8. The node location tracking method according to claim 7, wherein the movement based tracking step comprises a SoG filter resetting step, a SoG filter updating step, a SoG filter merging step and a weight transfer step.

9. The node location tracking method according to claim 6, wherein $\sigma$ is 3.

* * * * *